United States Patent [19]

Eckardt et al.

[11] Patent Number: 5,093,053
[45] Date of Patent: Mar. 3, 1992

[54] METHOD OF MANUFACTURING MULTIPLE-LAYER MOLDED ARTICLES OF THERMOPLASTIC MATERIAL

[75] Inventors: Helmut Eckardt, Meinerzhagen; Jürgen Ehritt, Hilchenbach-Müsen, both of Fed. Rep. of Germany

[73] Assignee: Battenfeld GmbH, Meinerzhagen, Fed. Rep. of Germany

[21] Appl. No.: 581,445

[22] Filed: Sep. 12, 1990

Related U.S. Application Data

[63] Continuation of Ser. No. 214,493, Jul. 1, 1988, abandoned.

[30] Foreign Application Priority Data

Jul. 1, 1987 [EP] European Pat. Off. ........... 87109459

[51] Int. Cl.⁵ .............................................. B29C 67/22
[52] U.S. Cl. ..................................... 264/45.1; 264/50; 264/255; 264/510; 264/570; 264/572
[58] Field of Search ................. 264/45.1, 45.5, 50, 264/570, 572, 510, 500, 255

[56] References Cited

U.S. PATENT DOCUMENTS

| | | | |
|---|---|---|---|
| 4,115,491 | 9/1978 | Hanning | 264/45.1 |
| 4,208,368 | 6/1980 | Egli | 264/45.5 |
| 4,247,515 | 1/1981 | Olabisi | 264/45.1 |
| 4,435,523 | 3/1984 | Ponzielli | 264/45.5 |
| 4,474,717 | 10/1984 | Hendry | 264/45.5 |
| 4,507,255 | 3/1985 | Shizawa | 264/45.1 |
| 4,657,496 | 4/1987 | Ozeki et al. | 264/45.1 |
| 4,777,186 | 10/1988 | Stang et al. | 264/50 |

FOREIGN PATENT DOCUMENTS

| | | | |
|---|---|---|---|
| 59-227425 | 12/1984 | Japan | 264/45.5 |
| 61-239916 | 10/1986 | Japan | 264/50 |

Primary Examiner—Robert A. Dawson
Assistant Examiner—Allan R. Kuhns
Attorney, Agent, or Firm—Toren, McGeady & Associates

[57] ABSTRACT

A method of manufacturing multiple-layer molded articles with an outer skin of compact thermoplastic material and a core of foamed thermoplastic material includes initially introducing the material for the skin into a mold cavity in a quantity sufficient for the desired thickness of the skin and subsequently feeding into the mold cavity the material for the core to which the expanding agent has been added. During and/or after being introduced into the mold cavity, the core material containing expanding agent is temporarily subjected by means of an additional gas and/or a pressurized, low-boiling liquid to an active pressure which exceeds the gas pressure of the expanding agent. Subsequently, the additional gas or the low-boiling liquid is removed from the hollow space which is still free of skin material and core material.

7 Claims, 2 Drawing Sheets

METHOD OF MANUFACTURING MULTIPLE-LAYER MOLDED ARTICLES OF THERMOPLASTIC MATERIAL

This is a continuation of application Ser. No. 07/214,493, filed July 1, 1988 now abandoned.

BACKGROUND OF THE INVENTION

1. Field of the Invention

The present invention relates to a method of manufacturing multiple-layer molded articles with an outer skin of compact thermoplastic material and a core of foamed thermoplastic material. The method includes initially introducing the material for the skin into a mold cavity in a quantity sufficient for the desired thickness of the skin and subsequently feeding into the mold cavity the material for the core to which an expanding agent has been added.

2. Description of the Prior Art

In a method of the above-described type known from British Patent 1,303,517, initially a certain amount of thermoplastic material for forming the skin is injected into a mold cavity. Subsequently, the thermoplastic material for forming the core to which an expanding agent has been added is introduced in such a quantity that it completely fills that portion of the cavity which has not been filled by the material for the skin. Immediately thereafter, the volume of the mold cavity is enlarged, so that the thermoplastic material which was supplied last can be foamed as a result of the expanding agent contained therein. A portion of the material of the skin penetrates in and fills out the additionally freed volume of the mold cavity.

This known method can only be carried out with the use of so-called breathing tools. Such tools are difficult to manufacture and maintain. This known method has the additional disadvantage that molded articles manufactured according to this method have a relatively high finished rate because, for ensuring a proper molding of the article, the core material which is foamable or to which an expanding agent has been added is required in a relatively large quantity in order to provide a sufficient internal pressure. However, this pressure can only be obtained if excessive foaming of the core material is prevented.

It is also already known to manufacture molded articles only from a plastics material to which an expanding agent has been added. In this method, the plastics material containing the expanding agent is introduced into the mold cavity against a gas pressure which is higher than the pressure which is generated by the expanding agent. Gas is then additionally introduced into the mold cavity in order to uniformly distribute the plastics material along the walls of the entire mold cavity. Finally, the pressure of the gas in the mold cavity is lowered, so that the expanding agent causes foaming of the plastics material towards the inside and, thus, the hollow space previously formed by introducing the gas is completely filled with foamed structure.

The known method described above has the disadvantage that it can only be carried out with very well sealed molding tools. Such molding tools are difficult to manufacture and maintain.

In accordance with another known method of manufacturing molded articles of plastics material, a plastics material without expanding agent is introduced into the mold cavity and is placed into contact with the walls of the cavity by subsequent introduction of a gas. A sudden pressure drop of the gas then causes a partial interconnection of the plastics material which is still molten in the interior into a so-called woven structure. As a result, relatively large hollow spaces are formed in the interior of the molded articles, with webs being irregularly distributed within the hollow spaces.

The formation of the webs within the molded articles is only random. In other words, the reproducibility of the inner structure of the molded articles is extremely low.

Another known method of manufacturing molded articles is the so-called gas injection method. In that method, the molten plastics material is injected without expanding agent into the mold cavity and is subsequently completely placed against the walls of the mold cavity with the aid of a gas. This method results in molded articles which have large hollow spaces.

However, the molded articles manufactured in accordance with this method cannot be subjected to great loads during use, because they easily fail due to the presence of the large hollow spaces.

It is, therefore, the primary object of the present invention to provide a method of manufacturing molded articles with a compact skin layer and a foamed core which, in spite of obtaining significant density reductions in the core portion, ensure a problem-free formation of the skin portion or surface portion and which, moreover, requires a reduced dwell time in the injection mold.

SUMMARY OF THE INVENTION

In accordance with the present invention, during and/or after being introduced in the mold cavity, the core material containing expanding agent is temporarily subjected by means of an additional gas to an active pressure which exceeds the gas pressure of the expanding agent and the additional gas is subsequently removed from the hollow space which is still free of skin material and core material.

The method according to the present invention provides the advantage that the density of the foamed core material of the finished molded article can be varied within wide limits without impairing the surface quality or skin quality of the molded article.

Compared to conventional methods of manufacturing multiple-layer molded articles, the density reductions may reach between 10 and 50% and, thus, it is possible to save material and weight. It has also been found that the use of the method of the present invention makes it possible to more quickly remove the finished molded articles from the mold because substantially reduced residual gas pressures occur in the core material and, thus, the residual pressures can no longer have the effect that the finished molded articles will lose their shape. In addition, compared to conventional manufacturing methods, the dwell times of the molded articles in the injection molding tool can be reduced by about 10% or more.

In accordance with a feature of the present invention, the additional gas is introduced into the mold cavity before the feeding of the core material into the mold cavity has been concluded, so that the period of introducing the additional gas overlaps the period of introducing the core material.

In accordance with another important feature, the additional gas is maintained in the mold cavity over a period of time of several seconds. Also, the pressure of the additional gas may be kept at the same level over the entire dwell time within the mold cavity. Moreover, it is possible to reduce the pressure of the additional gas continuously or in a step-like manner after a certain dwell time in the mold cavity has elapsed.

In accordance with another feature of the present invention, a pressurized, low-boiling liquid may be introduced into the mold cavity either together with the additional gas or instead of the additional gas.

When the method according to the present invention is carried out, an amount of a compact, thermoplastic material is injected into the mold cavity. The amount of the material is predominantly determined by the desired thickness of the skin layer of the molded article. A foamable plastics material containing an expanding agent is then injected with or without time overlap. The amount of the foamable plastics material can be varied within certain limits and is a determining factor for the foam structure of the core material to be obtained. The additional gas and/or the low-boiling liquid which are under increased pressure are then injected into the mold cavity either with time overlap or immediately after the injection of the thermoplastic material for the core. As a result, a hollow space is formed in the plastics material containing expanding agent for forming the core. The hollow space has the effect that the higher pressure of the additional gas or of the liquid as compared to the pressure of the expanding agent causes the molded article to be injection molded evenly and well within the mold cavity. The complete filling of the molded article, particularly when low densities are desired, is effected only by injecting the additional gas or the liquid. As soon as the gas pressure of the additional gas or of the liquid has been lowered after several seconds, the expanding agent in the plastics material for the core causes this material to foam toward the inside and, thus, to completely fill with foam the hollow space which previously had been formed by the additional gas or by the liquid. The method according to the invention results in molded articles which have a compact surface of injection molded quality, while having a foam core of light weight which has a very uniform foam structure and does not contain any other hollow spaces, so that the molded article can be removed from the mold more quickly.

As a consequence of foaming in the hollow space previously kept free by the additional gas or by the liquid, the residual gas pressure in the core material is substantially reduced.

In addition to the possible significant reductions in density in the core region of the molded article and the reduction of the dwell time of the finished molded articles in the injected mold, the invention provides further advantages. For example, the molded articles have no hollow spaces because, after the pressure of the additional gas or of the liquid have been removed, the core material can uniformly foam toward the inside at all locations and, thus, a high stiffness and strength of the molded article is obtained.

Even in the case of molded articles having complicated shapes with substantially differing wall thicknesses, the method according to the present invention results in a very uniform weight reduction over the entire cross-sectional area of the molded article.

Finally, the foaming of the core material uniformly toward the inside leads to a pressure reduction, so that the finished molded article has only very low internal stresses.

The method according to the present invention can be used equally well whether the expanding agent for foaming the thermoplastic for the core is a chemical expanding agent or a physical expanding agent.

The use of a chemical expanding agent is very simple because this expanding agent can be added to the granulate before it enters the screw of the plasticizing extruder.

Liquid or gaseous physical expanding agent can be injected in the work range of the screw of the plasticizing extruder. As compared to chemical expanding agents, physical expanding agents have the advantage that they lead to the generation of higher expansion gas pressures and, thus, may lead to a greater expansion of the foaming core material. This makes it possible to obtain lower densities in the finally foamed core material.

Instead of the gas which is injected as the third component, or together with this gas, it is also possible to inject a liquid having the appropriately high pressure which exceeds the gas pressure of the core material containing the expanding agent. Additional advantages can be obtained by selecting different liquids.

If liquid expanding agents, for example, fluorohydrocarbons, are used, the sudden pressure drop after the pressure of the injected additional gas has been lowered can lead to a sudden expansion of the expanding agent and, as a consequence, a sudden temperature drop, i.e., a cooling agent effect takes place. This means that the cooling times of the molded articles can be favorably influenced, i.e., the dwell time of the molded article in the injection mold can be further reduced. Also, it is possible to inject liquified gases, for example, nitrogen.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

DETAILED DESCRIPTION OF THE INVENTION

Figure 1:
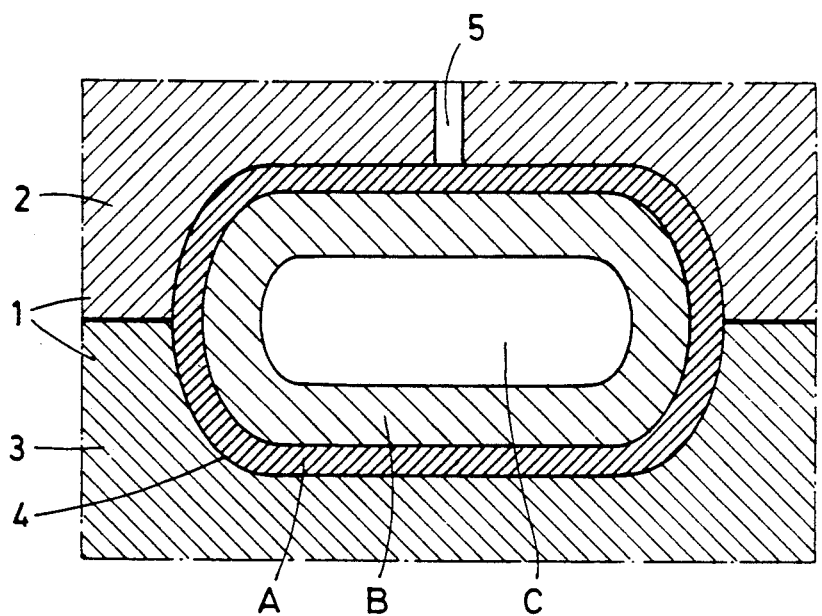
FIG. 1 is a schematic sectional view of an injection molding tool with a mold cavity into which two different thermoplastic materials have been injected, the distribution of the materials being effected by the introduction of an additional gas.

The injection molding tools 1 illustrated in FIGS. 1-6 of the drawing each have two mold halves 2 and 3 which can be opened and closed relative to each other. In the closed state of the mold halves 2 and 3 or of the injection molding tool 1, the two mold halves 2 and 3 define a mold cavity 4. Thermoplastic material can be introduced into the mold cavity 4 through at least one sprue 5.

Figure 3:
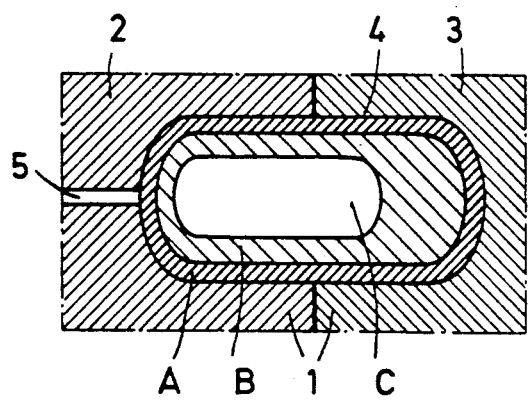
FIG. 3 is a sectional view, on a smaller scale, similar to FIG. 1, however, with the two plastics materials being distributed differently within the mold cavities.
Figure 5:
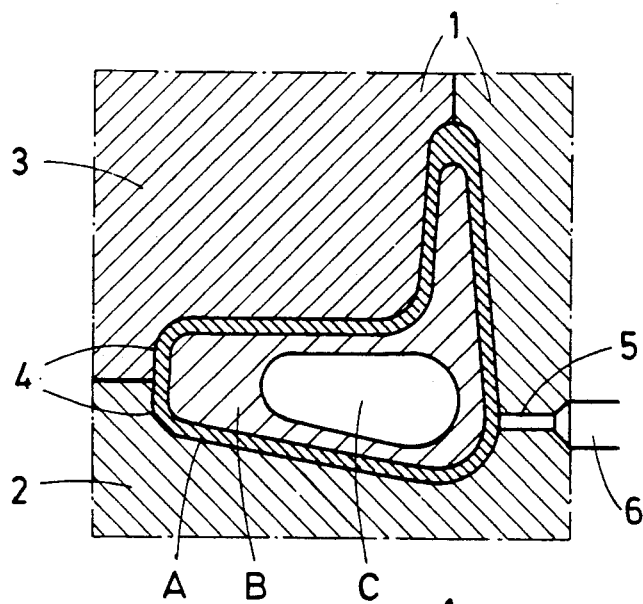
FIG. 5 is a sectional view, showing conditions corresponding to those of FIGS. 1 and 3, with a molded article having an asymmetrical cross-section.

As illustrated in FIGS. 1, 3 and 5, initially a compact thermoplastic material A is injected into the mold carrier 4 through sprue 5. The injection is effected in such a way that the thermoplastic material is distributed immediately along the walls of the injection molding tool forming the mold cavity 4 and with a material layer thickness which is as uniform as possible.

Subsequently, another thermoplastic material B is injected into the mold cavity 4 through sprue 5. A chemical or physical expanding agent is added to plastics material B.

Immediately after or overlapped with respect to time with the injection of the plastics material B, an additional gas C is forced through the sprue 5 into the mold cavity 4. The additional gas C has an active pressure which significantly exceeds the gas pressure of the expanding agent of the plastics material B.

Instead of the additional gas C or together with the gas C, it is also possible to force into mold cavity 4 a low-boiling liquid, for example, fluorohydrocarbon, which has the appropriate pressure.

The additional gas C and/or the liquid cause the thermoplastic material B to be distributed within the mold cavity 4 along the already formed skin layer of plastics material A. The core region of the mold cavity 4 is kept free of plastics material B by a gas bubble and/or by the liquid filling.

After the thermoplastic material B has been distributed in the manner shown in FIGS. 1, 3 and 5, which is the case at the latest several seconds after the material B has been injected, the pressure of the additional gas C in the core region of the mold cavity 4 is now reduced and/or the low-boiling liquid is withdrawn.

Depending on the given requirements, the pressure reduction of the additional gas C and/or the withdrawal of the liquid can take place continuously or in a step-like manner.

Figure 2:
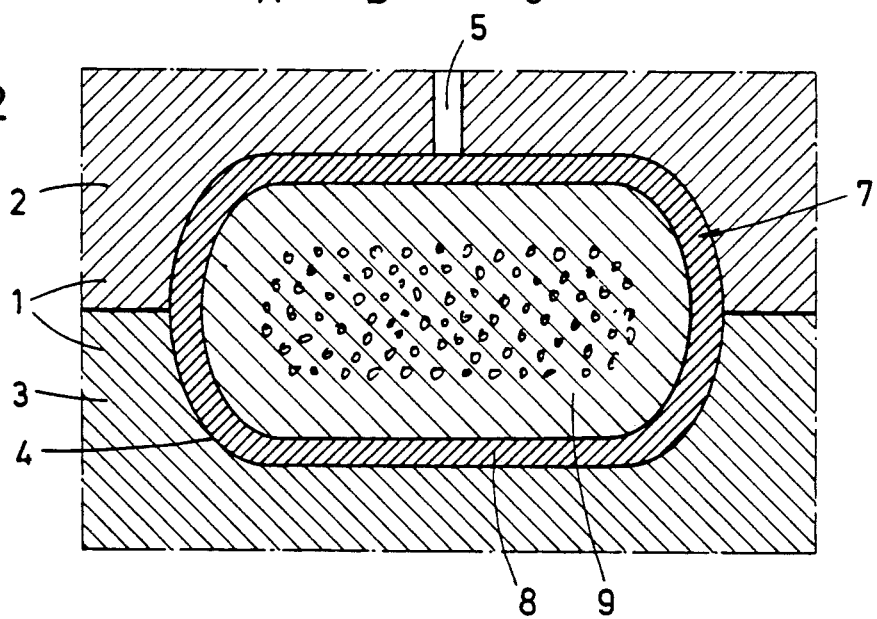
FIG. 2 is a sectional view corresponding to FIG. 1, however, after the additional gas has been removed from the mold cavity resulting in a changed distribution of the plastics material for the core of an injection molded article.
Figure 4:
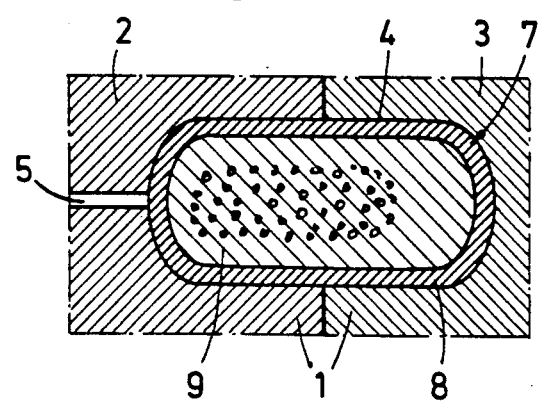
FIG. 4 is a sectional view, on a smaller scale, similar to FIG. 2, with a finished molded article in the mold cavity.
Figure 6:
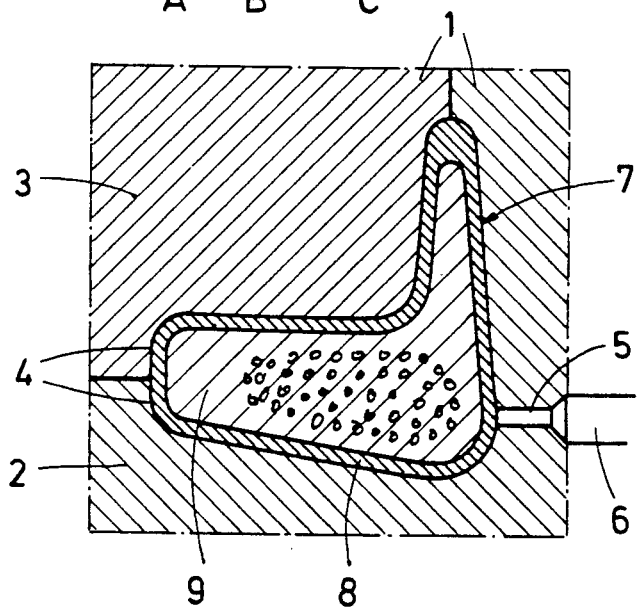
FIG. 6 is a sectional view, showing conditions corresponding to those of FIGS. 2 and 3, with a molded article having an asymmetrical cross-section.

Under the influence of the expanding agent, the thermoplastic material B now expands into the core region of the mold cavity 4 which has been maintained or made free and fills this free space uniformly with a foam structure, as indicated in FIGS. 2, 4 and 6 of the drawing. The result is a molded article 7 which has a compact skin layer 8 which is composed of plastics material A and contains a foamed core 9 made of the plastics material B.

The density of the foam structure in the core 9 of the molded article 7 is determined by the amount of thermoplastic material B which had previously been forced into the mold cavity 4 of the injection molding tool 1 through the sprue 5. When the amount of plastics material B containing the expanding agent is relatively large, a correspondingly high density of the foam structure within the core 9 is obtained. If, on the other hand, only a small amount of the plastics material B is injected, the foam structure of the core 9 of the molded article 7 has a low density.

A comparison of FIGS. 1 and 3 of the drawings shows that by varying the location of the sprue 5 relative to the cavity 4 of the molding tool 1 it is possible to influence particularly the distribution of the thermoplastic material B within the mold cavities 4, so that the gas bubble formed by the additional gas C assumes a different position within the plastics material B.

However, as indicated in FIGS. 2 and 4, the finished molded article 7 still has a uniform foam structure in core 9.

As FIGS. 5 and 6 of the drawing show, molded articles with relatively complicated cross-sections and different wall thicknesses in different cross-sectional areas can be easily and safely manufactured by the above-described method according to the present invention.

Figure 7:
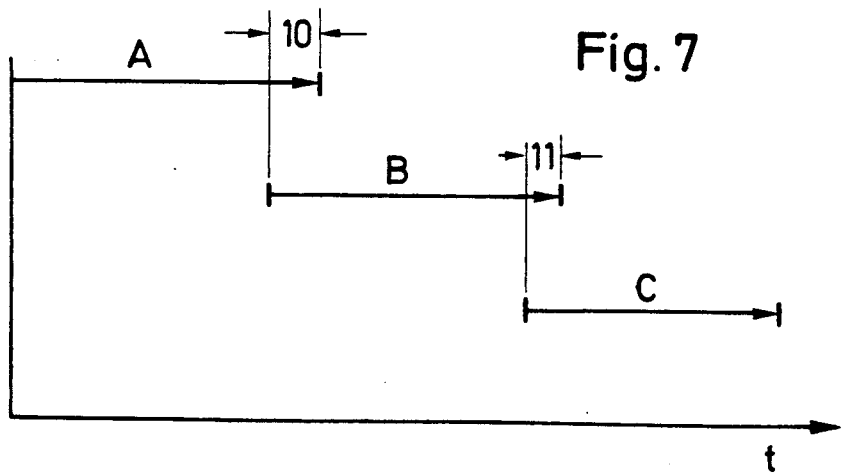
FIG. 7 is a diagram showing the sequence of method steps utilized in manufacturing the molded articles.

FIG. 7 of the drawing shows the sequence in which the two thermoplastic materials A and B and the additional gas C and/or the low boiling liquid can be injected into the mold cavity of the injection molding tool 1.

Specifically, FIG. 7 shows that the thermoplastic material B containing the expanding agent can be injected with a time overlap 10 with the thermoplastic material A for forming the skin. On the other hand, FIG. 7 also shows that the additional gas C and/or the low-boiling liquid can be injected into the mold cavity 4 of the injection molding tool 1 at the same time as the thermoplastic material B with a time overlap, i.e., during the time period 11. The time overlaps 10 and 11 can be adjusted to different requirements, as can be seen from a comparison of the time periods 10 and 11. On the other hand, the method can also be carried out in such a way that no time overlaps 10 and/or 11 occur. Rather, the different materials may be injected one immediately following the other with respect to time.

FIG. 5 of the drawing further shows that, in molded articles having different wall thicknesses, the additional gas C penetrates to a significant extent into the cross-sectional area having the greater wall thickness and the gas bubble created in this area forms a more or less distinct hollow space. However, as can be seen in FIG. 6, this hollow space is completely eliminated when the thermoplastic material B is foamed. As a result, the foam structure of the core 9 is uniformly distributed over the entire cross-section and, thus, the molded article 7 has uniform properties over its entire cross-section. If, either together with the additional gas C or instead of gas C, a low-boiling liquid, for example, fluorohydrocarbon, is injected into the mold cavity 4 of the injection molding tool 1 for the temporary formation of a hollow space and the liquid is then at the appropriate time removed or the pressure thereof reduced, heat is removed to a significant extent from the plastics materials A and B in the injection molding tool 1. Thus, an additional cooling effect is obtained which makes it possible to substantially reduce the dwell times of the molded article 7 in the injection molding tool 1. Thus, the work cycles of the manufacture of the molded articles are shortened accordingly and the productivity of the injection molding machines is increased.

The compact thermoplastic material A for forming the skin layer 8, the thermoplastic material B containing expanding agent and used for forming the core 9 and the additional gas C and/or the low-boiling liquid can be injected into the mold cavity 4 of the injection molding tool 1 by means of an extruder head 6 attached to sprue 5, the extruder head 6 being of the type described in detail in patent application P 36 32 928.2.

While specific embodiments of the invention have been shown and described in detail to illustrate the application of the inventive principles, it will be understood that the invention may be embodied otherwise without departing from such principles.

We claim:

1. In a method of manufacturing multiple-layer molded articles with an outer skin of compact thermoplastic material and a core of foamed thermoplastic material, wherein the thermoplastic materials are introduced into a mold cavity of a molding tool in quantities required for manufacturing the molded articles, the improvement comprising initially injecting only the compact thermoplastic material for the skin with an injection pressure into the mold cavity in a quantity sufficient for the desired thickness of the skin, uniformly distributing the skin material directly along a wall surface forming the mold cavity, and only subsequently feeding into the mold cavity the entire amount of the thermoplastic material required for forming the core to which an expanding agent has been added, temporarily subjecting the core material containing expanding agent during and/or after being introduced into the mold cavity to an active pressure, which exceeds a gas pressure generated by the expanding agent, by means of a pressure medium, wherein the active pressure causes the thermoplastic material required for forming the core to be distributed within the mold cavity along the already formed skin, thereby creating a hollow space in a core region of the mold cavity free of plastics material, and finally removing the pressure medium which generates the active pressure from the hollow space which is still free of skin material and enclosed by the core material, and foaming the core material in the hollow space by means of the gas pressure of the expanding agent.

2. The method according to claim 1, wherein the pressure medium is introduced into the mold cavity before the feeding of the core material into the mold cavity has been concluded, so that the period of introducing the additional gas overlaps the period of introducing the core material.

3. The method according to claim 1, wherein the pressure medium is maintained in the mold cavity over a period of time of several seconds to form a gas bubble in the mold cavity.

4. The method according to claim 1, wherein the pressure of the pressure medium is maintained at the same level substantially over the entire dwell time within the mold cavity.

5. The comprising according to claim 1, comprising reducing the pressure of the pressure medium continuously after a certain dwell time in the mold cavity.

6. The method according to claim 1, comprising reducing the pressure of the pressure medium gas in a step-like manner after a certain dwell time in the mold cavity.

7. The method according to claim 1, comprising introducing a pressurized, low-boiling liquid into the mold cavity together with the pressure medium.

* * * * *